Patented June 30, 1936

2,046,150

UNITED STATES PATENT OFFICE 2,046,150

HYDROXY CARBOXYLIC ACID ESTERS

Henry L. Cox and Thomas F. Carruthers, South Charleston, W. Va., assignors, by mesne assignments, to Union Carbide and Carbon Corporation, a corporation of New York No Drawing. Application April 11, 1934,
Serial No. 720,074

16 Claims. (Cl. 260—106)

The invention relates to compositions of matter comprising alkoxy esters of acylated hydroxy acids. It has particular reference to the ester compositions formed by the interaction of a hydroxy carboxylic acid, a monoalkyl ether of an alkylene or polyalkylene glycol, and an aliphatic monocarboxylic acid, or its anhydride.

These new esters may best be described by referring to their method of preparation, which involves two separate, successive reactions. In the preferred manner, a hydroxy acid containing one or more carboxylic groups is first reacted with a glycol ether, whereby an alkoxy radical is substituted for the hydrogen of all the carboxyl groups. Further esterification is then effected with an aliphatic monocarboxylic acid, the radical of which, by replacing all of the hydroxyl groups, provides complete acylation of the original acid. Ester compositions are thus formed in which esterification of both carboxyl and hydroxyl groups is complete, and the resulting products are stable compounds having properties of value for use as plasticizers.

The hydroxy acids suitable in this reaction include monobasic, dibasic, and polybasic acids containing one or more hydroxyl groups. Lactic, malic and citric acids, for example, contain a single hydroxyl group, and one, two and three carboxyl groups respectively. Tartaric and saccharic acids are dihydroxy dibasic, and polyhydroxy dibasic acids respectively. All of these acids, and the like, are contemplated by the present invention, and esterification in all instances is conducted to the point where no free hydroxyl or carboxyl groups remain in the final product.

Representative of the alkoxy alcohols which may be used are the methyl, ethyl, butyl, or other alkyl ethers of ethylene glycol or diethylene glycol. The monoethers of propylene or dipropylene glycol will also show a similar reaction. For the final esterification, acetic acid or anhydride is preferred, although other aliphatic monobasic acids or anhydrides, such as propionic and butyric anhydride, can also be used. Where it is desirable to decrease the solubility of the ester in water, the butyryl derivative may be preferred over the acetyl derivative.

Specific ester compositions within this invention, and their method of preparation are shown by the following examples.

Example 1

Tartaric acid and monobutyl ether of ethylene glycol, in the amount of 600 grams (4 mols) and 1000 grams (8.5 mols) respectively, were heated in the presence of 0.1% of sulfuric acid as a catalyst. The water formed was removed with benzene, and the reaction was completed at a temperature of 158° C. 850 grams (8.3 mols) of acetic anhydride was then added, and the mixture was heated at the boiling point (130° C.) for two hours. Distillation under reduced pressure was used to remove acetic acid and excess acetic anhydride. A resulting product of 1056 grams was obtained. This was a slightly viscous liquid, insoluble in water, having a boiling point of 236° C. at 5 mm. pressure, and a specific gravity of 1.083 at 20/20° C. The ester may be termed di-(butoxyethyl) diacetyl tartrate.

Example 2

In a manner analogous to the above, a mixture of 420 grams (2 mols) of citric acid and 608 grams (8 mols) of monomethyl ether of ethylene glycol was heated in the presence of 0.1% of sulfuric acid. The water was removed with benzene, and excess of the methyl ether was distilled off under reduced pressure. An excess of acetic anhydride, 306 grams (3 mols), was then added, and the mixture heated to boiling for one hour. The acetic acid formed, and the excess acetic anhydride were removed under reduced pressure. The remaining mixture was neutralized, washed repeatedly with water, and the water removed with benzene. A viscous liquid product was obtained, which showed a saponification value equal to that calculated for the compound tri-(methoxyethyl) acetyl citrate. The ester was partially soluble in water, and had a specific gravity of 1.189 at 20/20° C. It decomposed when distillation was attempted, even at reduced pressure, so the boiling point was not determined.

Example 3

An excess of monoethyl ether of diethylene glycol, 1610 grams (12 mols), was heated with 1060 grams (85%—10 mols) of lactic acid, in the presence of 1% of aluminum sulfate as a catalyst, and at a reaction temperature of 95° to 140° C. Benzene was again used as the water removing agent, and the reaction was completed in about six hours, as indicated by the amount of water removed. The excess ether was distilled off, and 1872 grams (12 mols) of butyric anhydride was then added. During the addition of the anhydride the temperature was held at 170° C., and the mixture was then heated for another two hours at 150° C. Excess butyric acid and anhydride were removed by distillation under reduced pressure, and the crude product was neutralized with soda ash solution, washed with water, and finally distilled under vacuum. The final product was a slightly viscous liquid, insoluble in water, having a specific gravity of 1.043 at 20/20° C. Its equivalent weight, as determined by saponification, indicated a product which may be termed β-ethoxy ethoxyethyl butyryl lactate.

Modifications in the process, as indicated by these examples, may be made to suit the nature of the particular reacting ingredients used. The examples given are merely representative of many similar esters within the scope of this invention, which should not be limited other than as defined in the appended claims.

We claim:

1. As chemical compounds, esters of hydroxy carboxylic acids, in which the hydrogen of each carboxyl group is replaced by an alkoxy alcohol radical, and an aliphatic monocarboxylic acid radical is substituted for each hydroxyl group.

2. As chemical compounds, esters of hydroxy carboxylic acids, in which the hydrogen of each carboxyl group is replaced by the radical of a monoalkyl ether of an alkylene glycol, and an aliphatic monocarboxylic acid radical is substituted for each hydroxyl group.

3. As chemical compounds, esters of aliphatic hydroxy carboxylic acids, in which the hydrogen of each carboxyl group is replaced by the radical of a monoalkyl ether of ethylene glycol, and an aliphatic monocarboxylic acid radical is substituted for each hydroxyl group.

4. As chemical compounds, esters of aliphatic hydroxy carboxylic acids, in which the hydrogen of each carboxyl group is replaced by the radical of a monoalkyl ether of diethylene glycol, and an aliphatic monocarboxylic acid radical is substituted for each hydroxyl group.

5. As chemical compounds, esters of aliphatic hydroxy carboxylic acids, in which the hydrogen of each carboxyl group is replaced by the radical of a monoalkyl ether of an alkylene glycol, and an acetic acid radical is substituted for each hydroxyl group.

6. As chemical compounds, esters of aliphatic hydroxy carboxylic acids, in which the hydrogen of each carboxyl group is replaced by the radical of a monoalkyl ether of ethylene glycol, and an acetic acid radical is substituted for each hydroxyl group.

7. As chemical compounds, esters of aliphatic hydroxy carboxylic acids, in which the hydrogen of each carboxyl group is replaced by the radical of a monoalkyl ether of diethylene glycol, and an acetic acid radical is substituted for each hydroxyl group.

8. As chemical compounds, esters of tartaric acid, in which the hydrogen of each carboxyl group is replaced by the radical of a monoalkyl ether of an alkylene glycol, and an aliphatic monocarboxylic acid radical is substituted for each hydroxyl group.

9. As chemical compounds, esters of tartaric acid, in which the hydrogen of each carboxyl group is replaced by the radical of a monoalkyl ether of ethylene glycol, and an acetic acid radical is substituted for each hydroxyl group.

10. As chemical compounds, esters of citric acid, in which the hydrogen of each carboxyl group is replaced by the radical of a monoalkyl ether of an alkylene glycol, and an aliphatic monocarboxylic acid radical is substituted for the hydroxyl group.

11. As chemical compounds, esters of citric acid, in which the hydrogen of each carboxyl group is replaced by the radical of a monoalkyl ether of ethylene glycol, and an acetic acid radical is substituted for the hydroxyl group.

12. As chemical compounds, esters of lactic acid, in which the hydrogen of the carboxyl group is replaced by the radical of a monoalkyl ether of an alkylene glycol, and an aliphatic monocarboxylic acid radical is substituted for the hydroxyl group.

13. As chemical compounds, esters of lactic acid, in which the hydrogen of the carboxyl group is replaced by the radical of a monoalkyl ether of diethylene glycol, and a butyric acid radical is substituted for the hydroxyl group.

14. As a chemical compound, di-(butoxyethyl) diacetyl tartrate.

15. As a chemical compound, tri-(methoxyethyl) acetyl citrate.

16. As a chemical compound, β-ethoxy ethoxyethyl butyryl lactate.

HENRY L. COX.
THOMAS F. CARRUTHERS.